Oct. 18, 1938.   K. M. COBURN   2,133,281
WINDING DEVICE
Filed June 11, 1936
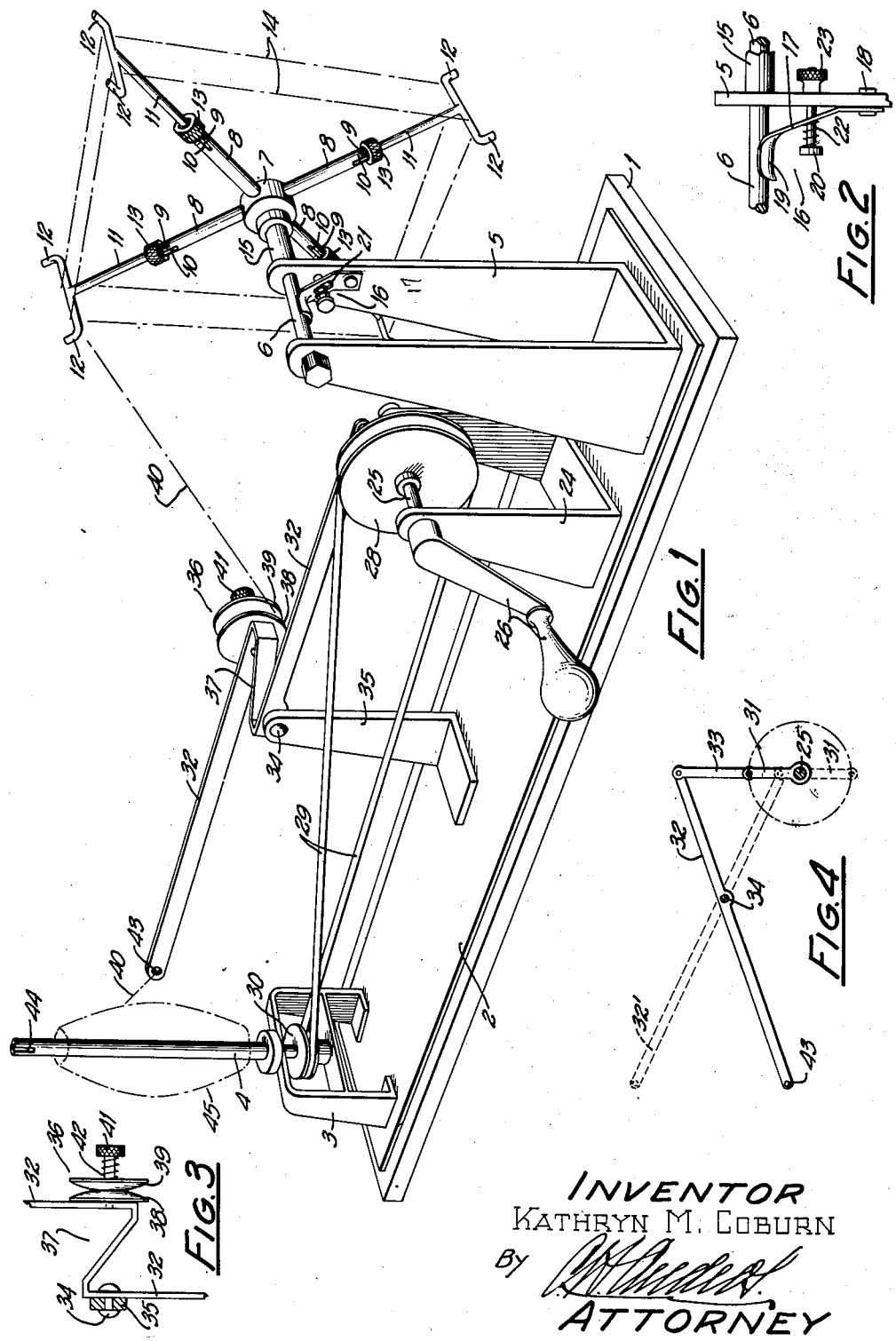
INVENTOR
KATHRYN M. COBURN
By
ATTORNEY Patented Oct. 18, 1938

2,133,281

UNITED STATES PATENT OFFICE 2,133,281

WINDING DEVICE

Kathryn M. Coburn, Albany, N. Y.

Application June 11, 1936, Serial No. 84,608

3 Claims. (Cl. 242—18)

Knitting yarns are sold in skeins of various size and, before the yarn can be used for knitting it must be wound from the skein into the form of a ball or bobbin. My invention therefore relates to winding devices and particularly to a device for rewinding skeins of knitting yarn into balls or bobbins whereby the yarn may be more conveniently used in knitting.

The objects are to provide a simple, inexpensive device for conveniently and quickly rewinding yarn from different size skeins on a bobbin from which it may be withdrawn in the form of a ball for hand knitting.

With these objects in view, my invention includes the novel elements and the combinations of elements described below and illustrated in the accompanying drawing in which—

Fig. 1 is a perspective view of my device;

Fig. 2 is an elevation view of a braking device which operates on the spindle of the skein holder;

Fig. 3 is an elevation view of a tensioning device; and

Fig. 4 is a diagrammatic elevation view showing the movements of the traversing device.

Referring to the drawing, my device comprises a base 1 preferably of wood and to which a thin metal plate 2 may be secured by screws (not shown) or any other suitable means. Secured at one end of the plate 2 by spot welding or otherwise is an inverted U-shaped strip of metal 3 forming a support or bearing for a bobbin 4 which is rotatably mounted therein, as shown. At the other end of the plate 2 is secured a U-shaped bearing support 5 in the upper end of which is rotatably mounted a horizontal shaft 6 carrying at one end a hub 7 into which are threaded, or otherwise secured, four tubular, radially-extending elements 8. The ends of the elements 8 remote from the hub are threaded as shown at 9 and also split as shown at 10. Telescoping within the tubular elements 8 are T-shaped rods 11 having the ends of the cross bar of the T turned up as shown at 12. Threaded on the split ends of the tubular elements 8 are knurled clamping nuts 13. Thus the radial arms for holding skein 14 are adjustable in length so that skeins of different size may be carried thereby. By loosening the clamping nuts 13 the rods 11 may be withdrawn from or pushed into the tubular elements 8 and secured in adjusted position by tightening the nuts 13. The hub 7 may be held in spaced relation to the support 5 by means of a sleeve 15 surrounding the shaft 6 and interposed between support 5 and hub 7.

In order that "overrunning" of the skein holder on the shaft 6 may be prevented a friction brake, represented generally by 16, bears on shaft 6. This brake comprises a resilient element 17 secured to the bearing support 5 by means of a rivet 18, or otherwise, and having the upper end thereof appropriately shaped, as shown at 19, to form a brake shoe bearing on shaft 6. In order that the friction of the brake shoe on the shaft 6 may be adjusted, a stud 20 passes through a slotted opening 21 in element 17 and through a hole in the support 5. A spring 22 is interposed between the resilient element 17 and the head of stud 20, and a knurled adjusting nut 23, bearing against the side of bearing support 5, is threaded on the end of the stud 20. By tightening or loosening the adjusting nut 23 the brake friction may be regulated. Mounted in a bearing support 24 secured to the base 2 intermediate the skein holder and the bobbin is a horizontal driving shaft 25 provided at one end with a hand operated crank 26. Mounted upon the shaft 25 is a pulley 28, and a belt 29 runs between the pulley 28 and a driven pulley 30 secured to the spindle or bobbin 4. Thus by turning the crank 26 the bobbin is rotated. The end of the shaft 25 remote from the hand crank 26 carries a crank arm 31 (see Fig. 4) which serves to rock a traversing element 32 through a link connection 33. The traversing element 32 comprises a lever pivotally mounted at 34 on a support 35 secured to base 2. Secured to the lever 32 and coaxial with the pivotal mounting 34 is a tensioning element represented generally at 36, and to facilitate the positioning of the tensioning element 36 coaxial with shaft 34, and also to space the end of element 32 somewhat from the bobbin, the element 32 is given a Z-like bend 37. The tensioning element comprises two discs 38 and 39 between which a strand 40 of skein 14 is passed. The discs 38 and 39 are yieldingly compressed together and the tension on the strand adjusted by means of the knurled adjusting nut 41 which compresses spring 42 between itself and disc 39. The free end of the traversing element 32 is spaced laterally from the spindle 4 to permit a ball of substantial size to be wound, and is provided with an opening 43 therein through which the strand 40 passes.

In operation, the skein to be rewound is placed upon the skein holder and the free end of a strand 40 is treaded through the tensioning element 36, the hole 43 in the end of the traversing element, and secured in the slot 44 in the upper end of spindle 4. The operator now turns the crank 26 which rotates the spindle 4 and thus winds the strand from the skein around the spindle. The traversing element 32 is rocked upon its pivotal mounting 34 by the crank 31 and the link connection 33 so that the end thereof near the bobbin is moved back and forth axially of the bobbin, and the yarn from the skein is thus wound into a ball of the general shape shown by the broken lines 45 in Fig. 1. When the skein has been completely wound on the bobbin 45, the ball may be slipped from the bobbin and yarn withdrawn from the ball for knitting purposes by pulling the end of the strand which was secured in slot 44 from the interior of the ball.

From the foregoing it will be clear that I have provided an extremely simple and efficient device for rewinding skeins into balls, and while I have described the preferred embodiment of my invention in considerable detail, it is to be understood that the words which I have used are words of description rather than of limitation. Hence, changes within the purview of the appended claims may be made without departing from the true scope and spirit of my invention in its broader aspects.

What I claim is:

1. In a device of the character described for rewinding a skein of yarn into a ball, the combination with a rotatable bobbin, of bobbin driving means including a rotatable shaft positioned in spaced relation to said bobbin, a traversing lever extending from a point adjacent said bobbin to a point adjacent said shaft, a pivotal mounting for said lever intermediate said shaft and bobbin, and means on said driving shaft cooperating directly with the adjacent end of said lever for oscillating the same on its pivotal mounting.

2. In a portable device of the character described for rewinding a skein of knitting yarn into a ball, the combination with a base, of a bobbin rotatably mounted thereon, bobbin driving means including a hand-operated shaft rotatably mounted on said base in spaced relation to said bobbin, a traversing lever pivotally mounted on said base and extending from a point adjacent said bobbin to a point adjacent said shaft, and means on said shaft cooperating directly with the adjacent end of said lever for oscillating the same on its pivotal mounting.

3. In a portable device of the character described for rewinding a skein of knitting yarn into a ball, the combination with a base, of a bobbin and a skein holder rotatably mounted thereon, bobbin driving means including a hand-operated shaft rotatably mounted on said base in spaced relation to said bobbin, a traversing lever pivotally mounted on said base and extending from a point adjacent said bobbin to a point adjacent said shaft, and means on said shaft cooperating directly with the adjacent end of said lever for oscillating the same on its pivotal mounting.

KATHRYN M. COBURN.